April 9, 1963
G. S. McLAY
3,084,524
FLEXIBLE COUPLINGS
Filed Nov. 14, 1961
3 Sheets-Sheet 1
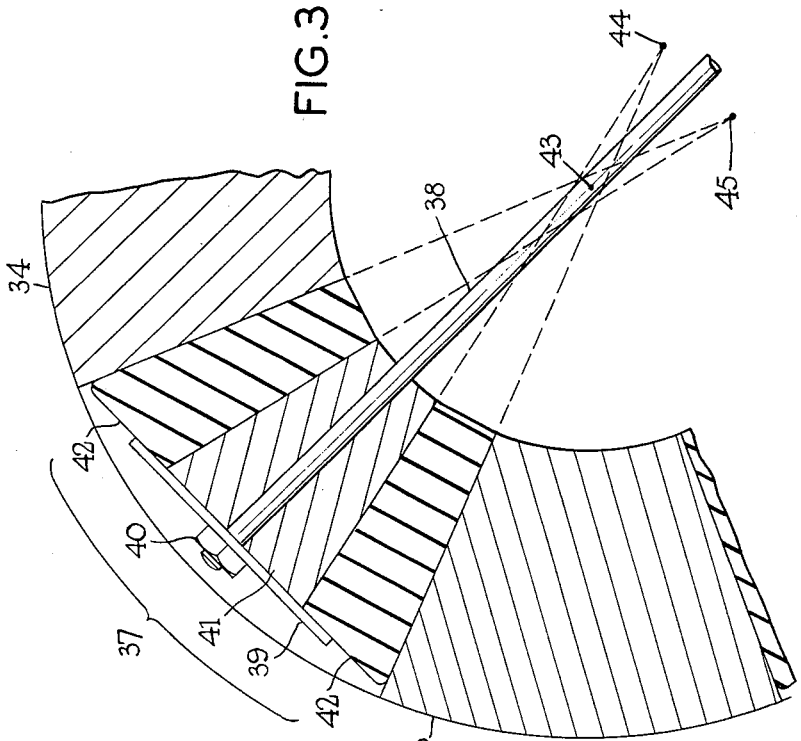
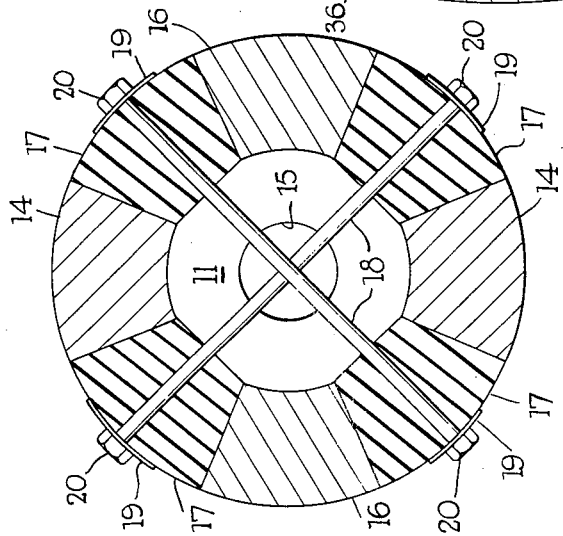
Gavin Smellie McLay
By Malcolm W. Fraser
Attorney April 9, 1963  G. S. McLAY  3,084,524
FLEXIBLE COUPLINGS Filed Nov. 14, 1961  3 Sheets-Sheet 2

Gavin Smellie McLay
By Malcolm W. Fraser
Attorney

April 9, 1963 G. S. McLAY 3,084,524
FLEXIBLE COUPLINGS
Filed Nov. 14, 1961 3 Sheets-Sheet 3

Gavin Smellie McLay
By Malcolm W. Fraser
Attorney

United States Patent Office 3,084,524
Patented Apr. 9, 1963

3,084,524
FLEXIBLE COUPLINGS
Gavin Smellie McLay, 22 Sheldon Ave., Highgate,
London N6, England
Filed Nov. 14, 1961, Ser. No. 152,244
Claims priority, application Great Britain Nov. 15, 1960
24 Claims. (Cl. 64—14)

The present invention relates to flexible couplings for the transmission of torque from a rotatable driving shaft to a rotatable driven shaft which is at least approximately aligned therewith.

It is an object of the invention to provide a flexible coupling which comprises two hubs adapted to be secured on a driving and driven shaft respectively, and resilient coupling elements which transmit torque from one hub to the other in compressive loading therebetween and to arrange that the coupling may be simply dismantled by separating the hubs with their attached shafts without the necessity for moving the shafts longitudinally away from each other.

It is a further object to ensure that the coupling elements are under substantially free and simple compression without any localised strain; in particular to avoid transmitting torque through fitted bolts in engagement with resilient material, since such arrangements lead to high localised concentrations of stress, and to avoid circumscribing resilient material such as rubber by non-resilient cells since such material is virtually incompressible and with such cells the coupling would be liable to become effectively a rigid coupling under abnormal load conditions.

It is the principal object to design a coupling element for such a coupling in which there is a relatively even distribution of load radially.

Figure 2:
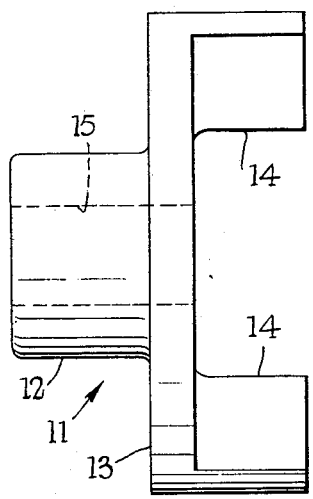
Figure 4:
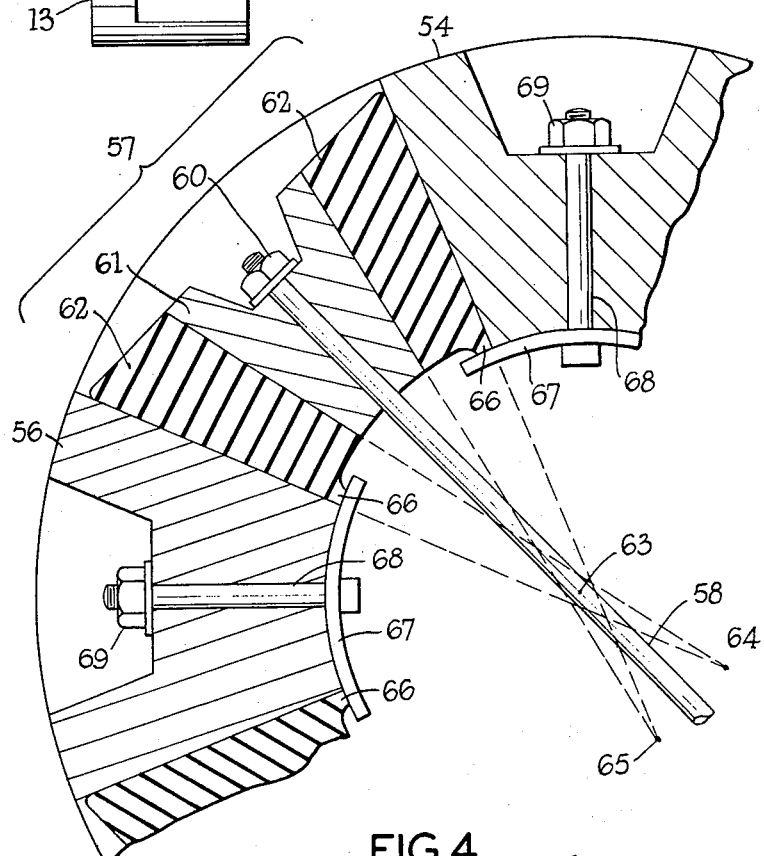
Figure 5:
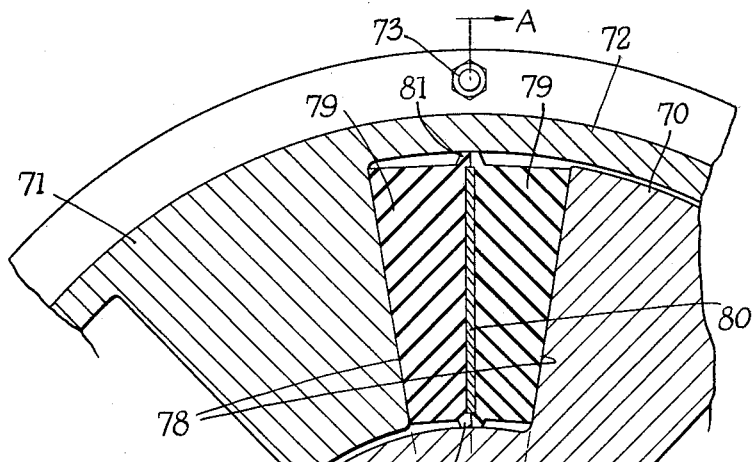
Figure 6:
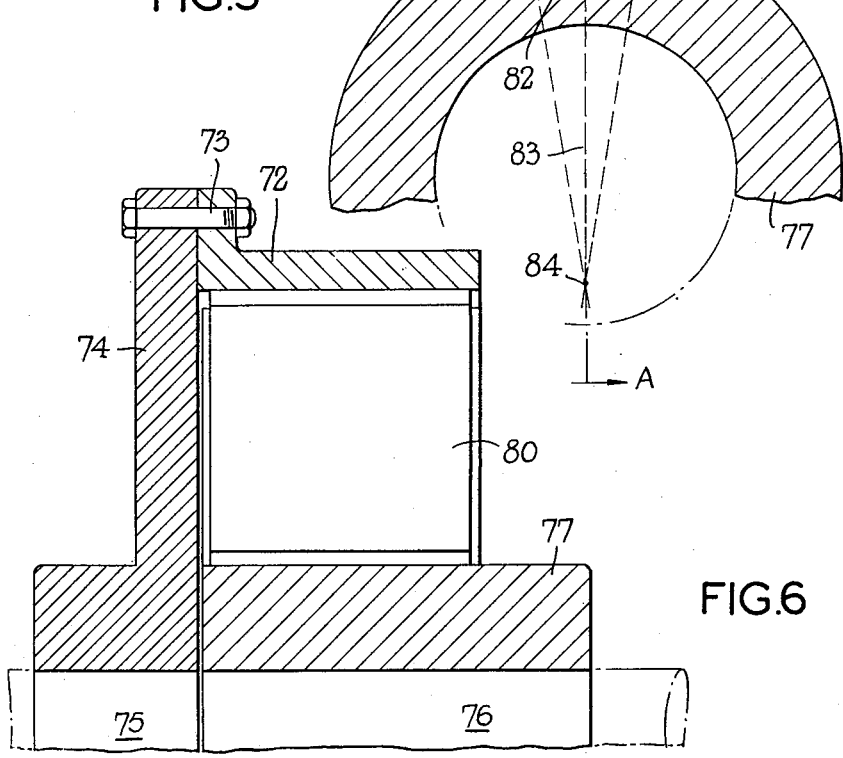

The invention is described below with reference to the accompanying drawings, in which:

FIGURE 1 is a sectional view, taken perpendicular to the rotational axis of a flexible coupling not in accordance with the present invention in that the flexible pads are of incorrect shape, FIGURE 2 is a side view of a hub comprised by the flexible coupling shown in FIGURE 1, FIGURE 3 is a partial sectional view, similar to that shown in FIGURE 1 but on a larger scale of one flexible coupling according to the invention, FIGURE 4 is a partial sectional view similar to FIGURE 3 of another coupling in accordance with the invention, and FIGURE 5 is a partial sectional view, similar to FIGURES 3 and 4, of yet another coupling in accordance with the invention, and FIGURE 6 is a projection of FIGURE 5 along the line A—A.

The flexible coupling shown in FIGURE 1 comprises a driving hub 11 which as shown in FIGURE 2, comprises a cylindrical hub 12 formed with a circular flange 13 from which project a pair of driving fins 14. The hub 11 has a central bore 15 adapted to receive a driving shaft and is provided with means (not shown) for securing it on such shaft. A driven hub, which is preferably of the same shape as the driving hub 11 and is adapted to be similarly secured on a driven shaft, is formed with a pair of driven fins 16 which, in the assembled flexible coupling, are disposed symmetrically between the driving fins 14. In the assembled coupling, the flanges of the two hubs face one another, with the free ends of the driving fins 14 spaced, in the axial direction, from the flange of the driven hub and the free ends of the driven fins 16 correspondingly spaced from the flange 13 of the driving hub. It will be noted that the greatest width of a driving fin 14 or driven fin 16 is less than the smallest separation between the driven fins 16 or the driving fins 14 respectively, so that (in the absence of resilient coupling elements to be described below) the hubs can be separated from one another without relative movement in the axial direction, for example by lifting the driving hub 11 vertically upwards (in FIGURE 1) so that the lower driving fin 14 passes vertically between the two driven fins 16.

As shown in FIGURE 1, the coupling also comprises four resilient coupling elements 17, each comprising a single resilient pad and each being disposed between one of the driving fins 14 and one of the driven fins 16. Torque applied to the driving fins 14 is transmitted by one or other diametrically opposite pair of the elements 17 (depending on the direction of the applied torque) to the driven fins 16, and it will be seen that only one such pair is being utilised at any given moment. The other pair may then be under no constraint due to frictional forces between them and the adjacent fins, and to prevent their radially outward escape in such conditions each pair of elements 17 are tied together by means of respective tie rods 18 which have retaining washers 19 of any desired shape retained on their opposite ends by means of bolts 20.

The tie rods 18 are slightly offset, relative to one another, in the axial direction of the coupling, thus giving clearance to allow of their crossing one another at the centre of the coupling. It will be observed that the transmission of torque in the coupling shown in FIGURE 1 takes place at flat faces of the fins 14 and 16, and the resilient coupling elements 17 are under a compressive load which does not manifest local irregularities giving rise to high local strains as in the case of resilient coupling elements to which torque is transmitted by way of fitted bolts. In the illustrated coupling, the tie rods serve to hold the coupling elements 17 in place, but do not transmit torque from a driving fin to an element or pad 17 or from an element 17 to a driven fin 16.

The pads or elements 17 are preferably composed of natural or synthetic rubber or an admixture of the two.

It will be seen, however, that the elements 17 in FIGURE 1 have radial bounding faces lying in planes which intersect at the rotational axis of the coupling and this feature is not in accordance with the invention. It is found that, even with a wedge angle of as little at 24°, such elements 17 of rubber show a ratio of torque to percentage compression which is only about half the value to be expected from values of the ratio of load to percentage compression obtained with the same rubber compressed between parallel surfaces. This finding, which limits the practical value of the coupling shown in FIGURE 1, may be explained in terms of the "shape factor" of a rubber element under compression.

It may be shown that, for a right prism, of a given rubber, compressed between parallel surfaces in contact with its opposite parallel ends, the ratio of load to percentage compression is proportional, for a wide variety of prism cross-sections, to "shape factor" defined as the area of the loaded surface (i.e. end) area of the prism divided by the unloaded surface area thereof, though the ratio of load to percentage compression is also a function of the percentage compression in that with increasing compression a greater incremental load increase is required to produce an equal increment of percentage compression.

If the wedge shaped elements or pads 17 are considered in the light of this knowledge, it will be appreciated that, since the radially outermost surface of an element is greater in area than the radially innermost surface, the element might be expected to behave as though its shape factor decreased with increasing radius. This would mean that a given angular movement towards one another of the two radial loaded surfaces of the element (giving equal percentage compression at all radial distances) would require the application of a load which decreased steadily with increased radius. That is, the transmission of torque from a fin 14 to a fin 16, involving compression of the respective interposed element or pad 17, involves greater loading near the axis of the coupling than at the outer periphery; and this inequality of loading is aggravated by the increase, with increased compression, of the ratio of load to percentage compression. These considerations result, therefore, in the relative overloading of the coupling near its centre and the relatively inefficient use of its outer peripheral parts, which is obviously not very satisfactory since a radial force applied near the axis represents less torque than an equal force applied at a greater radial distance. These shortcomings are largely obviated in the coupling represented by FIGURE 3 which embodies the invention. FIGURE 3 is generally similar to part of FIGURE 1, and shows one of two driving fins 34, and one of two driven fins 36, of a flexible coupling. The coupling is again provided with two tie rods of which a part of one tie rod 38, with one of its washers 39 and one of its nuts 40, is shown, but the four resilient coupling elements 37, of which one is shown, differ from the elements 17 in that they each comprise a nonresilient central part 41 through which the tie rods 38 pass, and a pair of resilient pads 42.

It will be seen that the angle subtended at the coupling axis 43 by the coupling element 37 as a whole is comparable with that subtended by an element or pad 17 in FIGURE 1, but that each of the resilient pads 42 subtends a much smaller angle. Further (and this feature distinguishes the invention) the boundary surfaces of each pad 42 are in planes which intersect not at the axis 43 but on more distant lines 44 and 45 respectively, which are parallel to the axis 43 but at a greater distance from the respective pads 42. The pads 42 are thus much less wedge shaped than the elements 17 and, moreover, due to the eccentricity of the lines 44 and 45, a given relative rotation towards one another of the fins 34 and 36 about the axis 43 results in a percentage compression of the pads 42 which increases with increasing radial distance.

The reduced wedge angle of the pads 42 results in an effective shape factor which is less variable with radial distance, and this in itself reduces the tendency for the applied load to be concentrated primarily near the centre of the coupling. Further, the eccentricity of the lines 44 and 45 means that, as the torque transmitted by the coupling is increased, and the compression of the pads is then also increased, the percentage compression is an increasing function of the radial distance and this leads to a tendency, opposing the tendency due to the radially-dependent effective shape factor, for the torque transmission to be concentrated at the outer periphery of the coupling.

It is thus possible, with a knowledge of the material to be used as pads 42 and of the way in which its ratio of load to percentage compression increases with percentage compression, to design a coupling in which, at the intended operating torque, the load distribution is substantially uniform over the surfaces of the pads 42 which bear against the driving and driven fins. With a particular rubber used in a prototype coupling in accordance with FIGURE 3 it was found satisfactory to design for a 10% compression of the pads 42 at their inner edges under normal loading and for a corresponding compression of 12½% at the radially outer edges.

Considerable control of the load distribution can be obtained by choice of the degrees to which the pads 42 are wedge-shaped and to which their bonding surfaces are non-radial, and the variation of effective shaped factor with radial distance can also be reduced, alternatively or additionally, by providing that the washers 39 (or 19 in FIGURE 1) overlie the otherwise free outer peripheral surfaces of the pads 42 (or of the elements 17 in FIGURE 1) to a greater or lesser extent. However, the pads 42 and elements 17 are not circumscribed by rigid material in such a way that they could ever be prevented thereby from undergoing further distortion, and there is thus no danger of the coupling becoming effectively rigid. In partciular, the distance between the flanges of the two hubs is made greater than the axial length of the pads 42 or elements 17, by an amount which allows free axial extension of the pads or elements even at the maximum contemplated overloading of the coupling.

Preferably, in the coupling shown in FIGURE 3, the pads 42 are bonded or otherwise adhered to the respective central part 41.

It will be appreciated that a coupling similar to that shown in FIGURES 1 and 2 may be made according to the invention by making the wedge angles of the fins 14 and 16 more obtuse and the wedge angles of the elements or pads 17 correspondingly more acute. Further, if desired, each of the illustrated pads 42 and elements 17 may be modified by including in it radially disposed rigid laminations which further alter the elastic qualities of the pad or the element as a whole. However, even without such laminations it is possible, with a coupling as shown in FIGURE 3 to provide a coupling of simple construction which, nevertheless, exhibits a surprisingly high torque capacity so that the design is of practical value over a wide range of applications.

The coupling shown in FIGURE 4 comprises a driving hub and a driven hub, the driving hub being provided with a pair of diametrically opposite driving fins 54 of which one is shown in FIGURE 4, and the driven hub being similarly provided with a pair of driven fins 56 of which one is also shown in FIGURE 4, the arrangement being very similar to that in the coupling shown in FIGURE 3. Between each driving fin 54 and each of the adjacent driven fins 56 is disposed a resilient coupling element which in FIGURE 4 is indicated generally by the reference 57, each resilient coupling element comprising a non-resilient central insert 61 and a pair of resilient pads 62 which bear against the central part 61 and against the respective driving and driven fins. As in the generally similar coupling illustrated in FIGURE 3, the opposite surfaces of each pad 62, and the surfaces of the central part 61 and of the driving or driven fins 54 or 56 against which they abut, lie in planes which intersect in lines such as 64 and 65 which are parallel to the rotational axis 63 of the coupling but more distant from the respective pad 62.

In the illustrated embodiment, the inner curved surface of each pad 62 subtends an angle of 15° at the rotational axis, but the bounding surfaces themselves are inclined to one another at a smaller angle, 9°. With the radial distance of the radially outer and inner bounding surfaces of the pads in a ratio of about 2:1, as shown, this provides that a relative rotational displacement towards each other of the driving and driven fins which produces a 10% compression of the pads at the inner surface, produces a 12½% compression at the outer surface.

Again as in the coupling shown in FIGURE 3 each coupling element 57 is tied to the diametrically opposite element 57 by a tie rod 58 whose opposite ends pass through the central parts 61 of the two coupling elements and have retaining nuts 60 secured on them.

In the coupling shown in FIGURE 4, the radially outward surfaces of the pads 62 are free and unconstrained, each pad being bonded to the surface of the central part 61 which it abuts, to prevent it from being displaced by centrifugal force. In accordance with the invention, however, the radially inward surface of each pad 62, at its end away from the central part 61 on which the pad is secured, if formed with a radailly inward projection 66 which abuts against an abutment which in the illustrated coupling is provided by a part-cylindrically curved plate 67. Four such plates are provided, each being mounted by means of a bolt 68 and nut 69 on one of the driving and driven fins 54 and 56. Each of the plates 67 extends in both directions beyond the bearing faces of the fin on which it is mounted, and its two ends are abutted by the projections 66 of two pads 62. It will be apparent that, alternatively, the fins could be formed with integral abutments for the projections 66 instead of being provided with separate plates 67 for the purpose.

The coupling would be assembled by first inserting the coupling elements 57 between the fins 54 and 56, with the projections 66 abutting or (if the pads are slightly irregular) the abutments provided for them, and then the tie rods 58 and their nuts 60 having been placed in position, tightening the nuts 60 to press the projections 66 against the abutments to the extent required to provide a desired degree of prestressing in the pads 62.

It will be observed that pressure between the projections 66 and their abutments assists in the dismantling of the coupling when the nuts 60 are unscrewed, since it tends to eject the elements 57. More significant, however, is the way in which the provision of the projections 66 and the abutments therefor permit the pads 62 to be prestressed, since such prestressing tends to compensate for any irregularity of the pads 62 which may appear during their manufacture, e.g. a broad tolerance determined by variations in cooling shrinkage after moulding.

The coupling shown in FIGURES 5 and 6 shows a coupling provided with more than two driving fins 70 and a corresponding number of driven fins 71, so as to increase the torque capacity of the coupling over the previous embodiments. Only part of one of each driving fin and part of one of each driven fin is shown in FIGURE 5. One hub is cast with the fins 70 projecting outwardly away from a central cylinder 77 mounted by means not shown to its shaft 76, and the other hub is cast in two parts; one part is cast with the fins 71 projecting inwardly from a cylindrical hood 72 and the said part 72 is mounted by means of bolts 73 to the other part 74 which comprises a flange integrally cast with a projecting hub for mounting it by means not shown to its shaft 75. Between each driving fin 70 and its adjacent driven fin 71 there is disposed a resilient coupling element indicated generally by the reference 78, which comprises a pair of pads 79, of rubber or suitable material with similar resilient properties, bonded to a rigid insert 80 (which is shown with parallel faces). The pads 79 bear against the driving and driven fins, and are held in position radially by ridge-like projections 81 and 82, which are in contact respectively with the hood 72 and the central cylinder 77.

As in the couplings illustrated in FIGURES 3 and 4, the opposite surfaces of each pad intersect at lines such as 84 which are parallel to the rotational axis 83, but more distant from the respective pads 79; further, as in FIGURE 4, the radially inner surface of each pad 79 of the illustrated embodiment of the present invention subtends an angle of 15° at the rotational axis, but the load-bearing faces themselves are inclined to one another at a smaller angle, 9°. The radial distance of the radially outer and inner surfaces of the pads in the said illustrated embodiment is in the ratio of about 2:1 as shown. This again provides that a relative rotational displacement towards each other of the driving and driven fins sufficient to produce a 10 percent compression of the pads at the radially inner surface, produces a 12½ percent compression at the radially outer surface. More generally, and this applies equally to the embodiments illustrated in FIGURES 3 and 4, it would be allowable for the bounding surfaces of a pad to be at an angle of up to 12° and for a 12½ percent compression at the radially outer surface to correspond to a compression of not more than 11 percent at the radially inner surface.

The coupling embodying the present invention has been described with the driving fins projecting from the inner cylinder 77. However it is not necessary for either hub to be always driving or always driven.

When a load is applied to the coupling of FIGURES 5 and 6 bulging takes place on the free surfaces of the resilient pads, such bulging being near zero at the bonded faces. There is only slight movement of the insert so that the pads are substantially under free and simple compression. There will, however, be a force tending to move each projection 81 against the face of the hood. This force will be equal to the sum of the centrifugal force and the radially outward component of the resultant of the forces acting on the loaded faces of the pair of pads. The said radially outward component force will be equal to twice the product of the force on each loaded face and the sine of half the angle between the loaded faces of the pads when under compression. The said summed outward force acting on the projection 81 will be balanced (when equilibrium has been reached) by the sum of the shear resistance of the resilient pads at the insert, and the compression resistance of each projection 81. The said compression resistance will be determined substantially by the size and shape of the projection, and it is possible, by a suitable choice of the variant factors, to design a resilient coupling element such that the pressure in pounds per square inch acting on the projection 81 at the hood face is very small, and also such that the shear resistance and compression resistance contribute in chosen proportion to the resultant radially inward reaction force.

If desired, the radially outward movement of the inserts 80 may be further restricted by making the said inserts wedge-shaped, the greater thickness of the wedges being towards the axis of the coupling. The said radially outward movement of the inserts 80 will virtually eliminate any load between the projections 82 and the inner cylinder 77.

The relative angular movement of each projection 81 and the hood, in the embodiment of FIGURES 5 and 6, will be half the angular movement of the coupling. It is possible, however, for each coupling element to comprise more than two, for example, three similar pads, separated by two inserts and therefore comprising two radially outward projections. In this case the said relative angular movement will be one third (for one projection) and two thirds (for the other projection) of the angular movement of the coupling.

The coupling is assembled in the following manner: The hood 72 is slipped in place over the inner cylinder 77 with the two sets of fins interleaved. The two hubs are then brought into position by simple lateral movement (e.g. vertical if the shafts are horizontal) and the hood 72 brought into contact with and bolted to the flange 74, after which the resilient coupling elements are introduced.

It will be appreciated that, like all the couplings described and illustrated, the coupling of FIGURES 5 and 6 provides for torque to be transmitted to and from the resilient components otherwise than through fitted bolts in engagement therewith and without the setting up of localised stresses which are inevitably associated with the use of such fitted bolts; again that due to the clearance provided by the inclusion of the projections 81 and 82 the pads 79 are not circumscribed by rigid material in such a way that they could become effectively rigid even should the coupling be greatly overloaded.

All the resilient pads described are preferably composed of natural or synthetic rubber or an admixture of the two, but any material having suitable elastic properties may be used. Many such substances bordering between "rubber" and "plastics" are now known and are commonly referred to as "elastomeric substances." Such substances which may be of natural and/or synthetic origin are suitable as material for the pads.

What I claim is:

1. A flexible coupling for the transmission of torque from a rotatable driving shaft to a rotatable driven shaft which is at least approximately aligned with the driving shaft, including a driving hub and a driven hub adapted to be attached respectively to the driving and driven shafts, symmetrically arranged and axially aligned fins on each hub, each fin of one hub being disposed between two adjacent fins of the other hub, disposed between each said fin of the one hub and each of the two said fins of the other hub a coupling element comprising at least one resilient pad composed of elastomeric material having two oppositely directed smooth faces lying respectively in two planes which intersect in a line substantially parallel to the rotational axis of the coupling and more distant from the pad than that axis, each pad also having a radially inner face directed towards the axis of the coupling and an oppositely directed radially outer face, wherein the said two planes subtend an angle, under zero coupling load, of not more than 12 degrees.

2. A flexible coupling as claimed in claim 1, wherein the distance between the said line and said axis is such that the ratio between the percentage compressions at the radially outer and inner faces of the pad, under the designed normal coupling load, and for a given pad material is not less than 12.5 to 11.

3. A flexible coupling as claimed in claim 2, wherein under the designed coupling load the percentage compression at the radially inner face of the pad is approximately 10% and the percentage compression at the radially outer face is approximately 12.5%.

4. A flexible coupling as claimed in claim 3, wherein the radial distance from the said axis of the radially outer and radially inner faces of each said pad are in a ratio of approximately 2:1.

5. A flexible coupling as claimed in claim 1, wherein the said two planes subtend an angle, under zero coupling load, of not more than 9°.

6. A flexible coupling as claimed in claim 1, wherein each coupling element is composed of one said pad.

7. A flexible coupling as claimed in claim 1, wherein said pads are composed of elastomeric material chosen from the group comprising natural rubber, synthetic rubber, and admixture of natural and synthetic rubber.

8. A flexible coupling for the transmission of torque from a rotatable driving shaft to a rotatable driven shaft which is at least approximately aligned therewith, comprising a driving hub adapted to be rigidly attached to the driving shaft and having a pair of diametrically opposite fins, a driven hub adapted to be rigidly attached to the driven shaft and also having a pair of diametrically opposite fins, the fins of each hub being axially aligned and the fin of one hub being disposed between two adjacent fins of the other hub, disposed between each said fin of the one hub and each of the two said fins of the other hub a coupling element comprising at least one resilient pad composed of elastomeric material having two oppositely directed smooth faces lying respectively in two planes which intersect in a line substantially parallel to the rotational axis of the coupling and more distant from the pad than that axis, each pad also having a radially inner face directed towards the axis of the coupling and an oppositely directed radially outer face, wherein the said two planes subtend an angle, under zero coupling load, of not more than 12 degrees.

9. A flexible coupling as claimed in claim 8, wherein each coupling comprises two said pads and, between the pads, a non-resilient bored central insert bounded by two oppositely directed smooth faces lying in planes which intersect in a line which is substantially parallel to the rotational axis of the coupling and is located between the insert and that axis and the coupling comprises, two connecting rods, screw-threaded at each end, each of which passes through the bore in an insert, a washer over one end of each connecting rod extending over a portion of the radially outer face of the said pads on each side of the insert, and nuts securing two diametrically opposite elements together by means of the connecting rods and their washers.

10. A flexible coupling as claimed in claim 9, wherein each fin has abutments which project in circumferential directions from the radially inner extremities, and wherein each coupling element comprises two said pads having projections projecting radially inwardly from radially inward corners of their abutting faces, said projections adapted to abut the abutments to prevent centripetal displacement of the coupling elements.

11. A flexible coupling as claimed in claim 8, wherein the distance between the said axis and the said line of intersection is such that the ratio between the percentage compressions at the radially outer and inner faces of the pad, under the designed normal coupling load and for a given pad material, is not less than 12.5 to 11.

12. A flexible coupling as claimed in claim 11, wherein under the designed normal coupling load the percentage compression at the radially inner face is approximately 10% and the percentage compression at the radially outer face is approximately 12.5% and wherein the respective radial distances from the said axis, of the radially outer and radially inner faces of the said pad are in a ratio of approximately 2:1.

13. A flexible coupling as claimed in claim 8, wherein each hub includes a circular flange plate carrying the fins which project towards the other hub and wherein the coupling also comprises means for connecting the two opposide coupling elements together so as to restrict centrifugal displacement.

14. A flexible coupling as claimed in claim 8, wherein each coupling element comprises a plurality of said pads separated by non-resilient inserts.

15. A flexible coupling as claimed in claim 8, wherein each coupling element comprises two said pads and, between the pads, a non-resilient bored central insert having oppositely directed smooth faces abutting spaced faces of the said pads over the whole area, and the coupling comprises two connecting rods, screw-threaded at aech end, each of which passes through the bore in an insert, a washer over one end of each connecting rod extending over a portion of the radially outer face of the said pads on each side of the insert, and nuts securing two diametrically opposite elements together by means of the connecting rods and their washers.

16. A flexible coupling as claimed in claim 8, wherein the greatest width of the fins of one hub is less than the smallest separation between the fins of the other hub.

17. A flexible coupling as claimed in claim 8, wherein the pads are composed of elastomeric material chosen from the group comprising natural rubber, synthetic rubber, and admixture of natural and synthetic rubber.

18. A flexible coupling for the transmission of torque from a rotatable driving shaft to a rotatable driven shaft which is at least approximately aligned with the driving shaft, including a driving hub and a driven hub attached respectively to the driving and driven shaft, symmetrically arranged and axially aligned fins on each hub, each fin of the one hub being disposed between two adjacent fins of the other hub, wherein the fins of one hub project radially outwardly from an inner cylinder forming part of the said one hub and the fins of the other hub project radially inwardly from a cylindrical hood forming part of the other hub, disposed between each said fin of the one hub and each of the two said fins of the other hub a coupling element comprising at least one resilient pad composed of elastomeric material having two oppositely directed smooth faces lying respectively in two planes which intersect in a line substantially parallel to the rotational axis of the coupling and more distant from the pad than that axis and which subtend an angle, under zero coupling load of not more than 12 degrees, each pad also having a radially inner face directed towards the axis of the coupling and an oppositely directed radially outer face, wherein each coupling element extends for most of the distance between said inner cylinder and said cylindrical hood and comprises a ridge-like resilient projection on both its radially inward and its radially outward faces, said projections extending in a direction approximately parallel to the said axis across the whole of each of these faces and abutting respectively the inner cylinder and the cylindrical hood to restrict centrifugal or centripetal displacement of the coupling elements.

19. A flexible coupling for the transmission of torque from a rotatable driving shaft to a rotatable driven shaft which is at least approximately aligned with the driving shaft including a driving hub and a driven hub adapted to be attached respectively to the driving and driven shaft, symmetrically arranged and axially aligned fins on each hub, each fin of one hub being disposed between two adjacent fins of the other hub, wherein the fins of one hub project radially outwardly from an inner cylinder forming part of the said one hub and the fins of the other hub project radially inwardly from a cylindrical hood forming part of the other hub, there being disposed between each said fin of the one hub and each of the two said fins of the other hub a coupling element extending for most of the distance between said inner cylinder and said cylindrical hood and comprising two resilient pads composed of elastomeric material each pad having two oppositely directed smooth faces lying respectively in two planes which intersect in a line substantially parallel to the rotational axis of the coupling, and more distant from the pad than that axis and which subtend an angle, under zero coupling load, of not more than 12 degrees, each pad also having a radially inner face directed towards the axis of the coupling and an oppositely directed radially outer face, a plate like non-resilient insert interdisposed between the two pads and bonded to them and extending radially nearly, but not completely, the full radial length of the said pad, pad portions overlapping the radially inner and outer edges of the said insert and bonded together around the insert at said edges, said overlapping pad portion forming ridge-like resilient projections extending in a direction approximately parallel to the said axis across the whole of each radially directed face and abutting respectively the inner cylinder and the cylindrical hood to restrict centrifugal or centripetal displacement of the coupling elements.

20. A flexible coupling as claimed in claim 19, wherein the distance between the said axis and the said line of intersection is such that the ratio between the percentage compressions at the radially outer and inner faces of the pad under the designed normal coupling load and for a given pad material, is not less than 12.5 to 11.

21. A flexible coupling as claimed in claim 20, wherein under the designed normal coupling load the percentage compression at the radially inner face is approximately 10% and the percentage compression at the radially outer face is approximately 12.5% and wherein the respective radial distances from the said axis, of the radially outer and radially inner faces of the said pad are in a ratio of approximately 2:1.

22. A flexible coupling as claimed in claim 19, wherein the cylindrical hood is detachably fastened to the remaining part of the said other hub.

23. A flexible coupling as claimed in claim 19, wherein the plate like non resilient insert increases in thickness radially in a direction towards said axis.

24. A flexible coupling as claimed in claim 19, wherein the pads are composed of elastomeric material chosen from the group comprising natural rubber, synthetic rubber, and admixture of natural and synthetic rubber.

References Cited in the file of this patent

UNITED STATES PATENTS

| | | |
|---|---|---|
| 1,548,629 | Pfander | Aug. 4, 1925 |
| 2,092,704 | Ricefield | Sept. 7, 1937 |
| 2,116,195 | Foster | May 3, 1938 |
| 2,213,277 | Guy | Sept. 3, 1940 |

FOREIGN PATENTS

| | | |
|---|---|---|
| 569,889 | Germany | Feb. 3, 1933 |